United States Patent
Lankford (10) Patent No.: US 9,113,185 B2
(45) Date of Patent: Aug. 18, 2015

(54) SYSTEMS AND METHODS FOR AUTHORIZING ACCESS TO NETWORK SERVICES USING INFORMATION OBTAINED FROM SUBSCRIBER EQUIPMENT

(75) Inventor: David Charles Lankford, New York, NY (US)

(73) Assignee: Sling Media Inc., Foster City, CA (US)

(*) Notice: Subject to any disclaimer, the term of this patent is extended or adjusted under 35 U.S.C. 154(b) by 38 days.

(21) Appl. No.: 12/821,983

(22) Filed: Jun. 23, 2010

(65) Prior Publication Data

US 2011/0321079 A1    Dec. 29, 2011

(51) Int. Cl.
*H04N 21/258* (2011.01)
*H04N 21/254* (2011.01)
*H04N 21/266* (2011.01)
*H04N 21/418* (2011.01)
*H04N 21/472* (2011.01)
*H04N 21/475* (2011.01)
(Continued)

(52) U.S. Cl.
CPC ...... *H04N 21/25816* (2013.01); *H04L 65/1069* (2013.01); *H04L 65/4084* (2013.01); *H04N 21/254* (2013.01); *H04N 21/2541* (2013.01); *H04N 21/25875* (2013.01); *H04N 21/266* (2013.01); *H04N 21/26613* (2013.01); *H04N 21/418* (2013.01); *H04N 21/4181* (2013.01); *H04N 21/4753* (2013.01); *H04N 21/47202* (2013.01); *H04N 21/6582* (2013.01)

(58) Field of Classification Search
USPC ........................................................ 725/109
See application file for complete search history.

(56) References Cited

U.S. PATENT DOCUMENTS

| | | |
|---|---|---|
| 6,421,429 B1 | 7/2002 | Merritt et al. |
| 6,732,158 B1 | 5/2004 | Hesselink et al. |
| 7,127,507 B1 | 10/2006 | Clark et al. |

(Continued)

FOREIGN PATENT DOCUMENTS

| | | |
|---|---|---|
| CN | 1981496 A | 11/1927 |
| EP | 1255395 A2 | 11/2002 |

(Continued)

OTHER PUBLICATIONS

Lucas, Brian et al. "Systems and Methods for Establishing Connections Between Devices Communicating Over a Network," U.S. Appl. No. 12/426,103, filed Apr. 17, 2009.

(Continued)

*Primary Examiner* — Justin Shepard
(74) *Attorney, Agent, or Firm* — Ingrassia Fisher & Lorenz, P.C.

(57) ABSTRACT

Systems and methods are described for authorizing access to network service based upon information obtained from a set-top box (STB) or other subscriber equipment associated with the user requesting access to the network service. The network service suitably contacts a subscriber device associated with the user via the network in response to a request for access that is received from the user. Information obtained from the subscriber device is processed to thereby determine if the user is authorized to use the service. If the user is authorized, then the service is provided via the network. Access to an online video stream, for example, can be conditioned upon the requesting user having an appropriate account with a cable, direct broadcast satellite (DBS) or other service that can be verified through contact with the user's STB or other subscriber equipment.

18 Claims, 3 Drawing Sheets

(51) Int. Cl.
*H04N 21/658* (2011.01)
*H04L 29/06* (2006.01)

(56) References Cited

U.S. PATENT DOCUMENTS

| | | | |
|---|---|---|---|
| 7,478,164 | B1 | 1/2009 | Lango et al. |
| 7,478,166 | B2 | 1/2009 | Agnoli et al. |
| 7,549,160 | B1 | 6/2009 | Podar et al. |
| 7,558,862 | B1 | 7/2009 | Tyukasz et al. |
| 7,594,218 | B1 | 9/2009 | Lozben |
| 7,647,430 | B2 | 1/2010 | Ng et al. |
| 7,676,590 | B2 | 3/2010 | Silverman et al. |
| 7,706,358 | B2 | 4/2010 | Kitada |
| 7,721,300 | B2 | 5/2010 | Tipton et al. |
| 7,721,315 | B2 * | 5/2010 | Brown et al. ............... 725/109 |
| 7,895,275 | B1 | 2/2011 | Evans et al. |
| 7,921,150 | B1 | 4/2011 | Schwartz |
| 7,945,688 | B1 | 5/2011 | Lango et al. |
| 7,975,047 | B2 | 7/2011 | Dongre |
| 8,171,148 | B2 | 5/2012 | Lucas et al. |
| 2002/0042921 | A1 | 4/2002 | Ellis |
| 2002/0143972 | A1 | 10/2002 | Christopoulos et al. |
| 2003/0074660 | A1 * | 4/2003 | McCormack et al. ............ 725/2 |
| 2003/0198243 | A1 | 10/2003 | Yamada |
| 2004/0177151 | A1 | 9/2004 | Kryeziu |
| 2004/0194141 | A1 | 9/2004 | Sanders |
| 2004/0221029 | A1 | 11/2004 | Jenkins et al. |
| 2005/0155077 | A1 | 7/2005 | Lawrence et al. |
| 2006/0034259 | A1 | 2/2006 | Matsuda |
| 2006/0064307 | A1 | 3/2006 | Pakkala |
| 2006/0095401 | A1 | 5/2006 | Krikorian et al. |
| 2006/0171395 | A1 | 8/2006 | Deshpande |
| 2006/0190616 | A1 | 8/2006 | Mayerhofer et al. |
| 2006/0206526 | A1 | 9/2006 | Sitomer |
| 2006/0230345 | A1 | 10/2006 | Weng et al. |
| 2006/0265384 | A1 | 11/2006 | Lee et al. |
| 2006/0280177 | A1 | 12/2006 | Gupta et al. |
| 2006/0294183 | A1 | 12/2006 | Agnoli et al. |
| 2007/0003224 | A1 | 1/2007 | Krikorian et al. |
| 2007/0019545 | A1 | 1/2007 | Alt et al. |
| 2007/0043792 | A1 | 2/2007 | O'Brien |
| 2007/0055728 | A1 | 3/2007 | Shea et al. |
| 2007/0061783 | A1 | 3/2007 | Prakash |
| 2007/0067390 | A1 | 3/2007 | Agnoli et al. |
| 2007/0073767 | A1 | 3/2007 | Springer, Jr. et al. |
| 2007/0107019 | A1 * | 5/2007 | Romano et al. ............... 725/80 |
| 2007/0136778 | A1 | 6/2007 | Birger et al. |
| 2007/0147263 | A1 | 6/2007 | Liao et al. |
| 2007/0183436 | A1 | 8/2007 | Hunter |
| 2007/0217407 | A1 | 9/2007 | Yuan et al. |
| 2007/0274327 | A1 | 11/2007 | Kaarela et al. |
| 2007/0288550 | A1 | 12/2007 | Ise et al. |
| 2008/0007651 | A1 | 1/2008 | Bennett |
| 2008/0059533 | A1 | 3/2008 | Krikorian |
| 2008/0060035 | A1 | 3/2008 | Tsang et al. |
| 2008/0195698 | A1 | 8/2008 | Stefanovic et al. |
| 2008/0209487 | A1 | 8/2008 | Osann et al. |
| 2008/0215392 | A1 | 9/2008 | Rajan |
| 2008/0229404 | A1 | 9/2008 | Siegrist et al. |
| 2008/0301233 | A1 | 12/2008 | Choi |
| 2009/0103607 | A1 | 4/2009 | Bajpai et al. |
| 2009/0133088 | A1 | 5/2009 | Kim et al. |
| 2009/0146779 | A1 | 6/2009 | Kumar et al. |
| 2009/0157777 | A1 | 6/2009 | Golwalkar et al. |
| 2009/0164600 | A1 | 6/2009 | Issa et al. |
| 2009/0254672 | A1 | 10/2009 | Zhang |
| 2009/0268740 | A1 | 10/2009 | Sindhu et al. |
| 2009/0282445 | A1 | 11/2009 | Yang et al. |
| 2010/0005483 | A1 | 1/2010 | Rao |
| 2010/0023642 | A1 | 1/2010 | Ladd et al. |
| 2010/0030880 | A1 | 2/2010 | Joshi et al. |
| 2010/0046513 | A1 | 2/2010 | Park et al. |
| 2010/0061708 | A1 | 3/2010 | Barton |
| 2010/0070925 | A1 | 3/2010 | Einaudi et al. |
| 2010/0077438 | A1 | 3/2010 | Ansari |
| 2010/0100898 | A1 | 4/2010 | Pfleging et al. |
| 2010/0146527 | A1 | 6/2010 | Craib et al. |
| 2010/0169477 | A1 | 7/2010 | Stienhans et al. |
| 2010/0226444 | A1 | 9/2010 | Thevathasan et al. |
| 2010/0269144 | A1 | 10/2010 | Forsman et al. |
| 2010/0281042 | A1 | 11/2010 | Windes et al. |
| 2010/0309916 | A1 | 12/2010 | Oskouy et al. |
| 2010/0333162 | A1 | 12/2010 | Lloyd et al. |
| 2011/0002381 | A1 | 1/2011 | Yang et al. |
| 2011/0047079 | A1 | 2/2011 | Du et al. |
| 2011/0050908 | A1 | 3/2011 | Nam |
| 2011/0125861 | A1 | 5/2011 | Evans et al. |
| 2011/0307608 | A1 | 12/2011 | Chang et al. |
| 2012/0039580 | A1 | 2/2012 | Sweatt, III et al. |
| 2012/0166669 | A1 | 6/2012 | Price |
| 2012/0219001 | A1 | 8/2012 | Sindhu et al. |

FOREIGN PATENT DOCUMENTS

| | | |
|---|---|---|
| EP | 2071839 A1 | 6/2009 |
| JP | 2001211416 A | 8/2001 |
| JP | 2001345766 A | 12/2001 |
| JP | 2003304231 A | 10/2003 |
| JP | 2005229152 A | 8/2005 |
| JP | 200654535 A | 2/2006 |
| JP | 2006295909 | 10/2006 |
| JP | 2007181123 A | 7/2007 |
| JP | 2008172621 A | 7/2008 |
| JP | 2009009582 | 1/2009 |
| JP | 2009077212 A | 4/2009 |
| JP | 2009118032 A | 5/2009 |
| WO | 2007096001 A1 | 8/2007 |
| WO | 2009073828 A1 | 6/2009 |
| WO | 2009073830 A1 | 6/2009 |
| WO | 2009134073 A2 | 11/2009 |

OTHER PUBLICATIONS

Paul, John Michael et al. "Systems and Methods for Delivering Messages Over a Network," U.S. Appl. No. 12/619,192, filed Nov. 16, 2009.
Curtis, Sean "Systems and Methods for Formatting Media Content for Distribution," U.S. Appl. No. 12/635,138, filed Dec. 10, 2009.
Paul, John et al. "Systems and Methods for Remotely Controlling a Media Server Via a Network," U.S. Appl. No. 12/645,870, filed Dec. 23, 2009.
Paul, John et al. "Systems and Methods for Searching Media Content," U.S. Appl. No. 12/648,024, filed Dec. 28, 2009.
Schaefer, Germar "Systems and Methods for Managing Content in Real-Time," U.S. Appl. No. 61/226,163, filed Jul. 16, 2009.
USPTO "Notice of Allowance" mailed Jan. 10, 2012; U.S. Appl. No. 12/426,103, filed Apr. 17, 2009.
USPTO "Non-Final Office Action" mailed Mar. 21, 2011; U.S. Appl. No. 12/426,103, filed Apr. 17, 2009.
European Patent Office, International Searching Authority, "International Search Report" mailed Mar. 18, 2011; International Appln. No. PCT/US2010/060797, filed Dec. 16, 2010.
European Patent Office, International Searching Authority, "International Search Report" mailed Nov. 16, 2011; International Patent Appln. No. PCT/US2011/039937, filed Jun. 10, 2011.
European Patent Office, International Searching Authority, "International Search Report," mailed Dec. 13, 2010; International Application No. PCT/US2010/029062 filed Mar. 29, 2010.
USPTO "Final Office Action" mailed Oct. 17, 2011; U.S. Appl. No. 12/426,103, filed Apr. 17, 2009.
Japan Patent Office, Notice of Rejection Ground mailed Oct. 29, 2013 for Japanese Patent Application No. 2012-546061.
Australian Government, Patent Examination Report No. 1 for Australian Patent Application No. 2011271358, mailed Nov. 15, 2013.
USPTO, Final Office Action, mailed Nov. 18, 2013 for U.S. Appl. No. 13/458,852.
Japan Patent Office, Notice of Rejection Grounds, dated Dec. 3, 2013 for Japanese Patent Application No. 2012-506055.
China State Intellectual Property Office, First Office Action mailed Nov. 8, 2013 for China Patent Application No. 201080016835.6.

(56) References Cited

OTHER PUBLICATIONS

Intellectual Property Office, Decision of the Intellectual Property Office mailed Dec. 30, 2013 for Taiwan Patent Application No. 099144605.
Ntellectual Property Office of Singapore "Search Report and Written Opinion" dated Nov. 8, 2012 for Singapore Appln. No. 201107539-7.
USPTO "Non-Final Office Action" mailed Dec. 21, 2012 for U.S. Appl. No. 12/648,024, filed Dec. 28, 2009.
USPTO "Final Office Action" mailed Feb. 21, 2013 for U.S. Appl. No. 12/619,192, filed Nov. 16, 2009.
USPTO "Non-Final Office Action" dated Feb. 25, 2013 for U.S. Appl. No. 13/458,852.
U.S. Patent and Trademark Office, Non-Final Office Action, mailed Mar. 27, 2014 for U.S. Appl. No. 12/645,870.
Japan Patent Office "Notice of Rejection Ground" dated Mar. 26, 2013 for Japanese Patent Appln. No. 2012-506055.
Australian Government "Patent Examination Report No. 1" dated Apr. 5, 2013 for Australian Patent Appln. No. 2010236888.
U.S. Patent and Trademark Office, Notice of Allowance, mailed May 9, 2014 for U.S. Appl. No. 13/458,852.
Australian Government, Notice of Acceptance, dated May 29, 2014 for Australian Patent Application No. 2011271358.
Intellectual Property Office "Office Action" issued May 20, 2013 for Taiwan Patent Appln. No. 099144605.
USPTO "Notice of Allowance" mailed Jun. 24, 2013 for U.S. Appl. No. 12/635,138.
USPTO "Non-Final Office Action" mailed Jun. 27, 2012 for U.S. Appl. No. 13/458,852, filed Apr. 27, 2012.
USPTO "Non-Final Office Action" mailed Jul. 19, 2012 for U.S. Appl. No. 12/619,192, filed Nov. 16, 2009.
USPTO "Non-Final Office Action" mailed Sep. 14, 2012 for U.S. Appl. No. 12/635,138, filed Dec. 10, 2009.
USPTO "Non-Final Office Action" mailed Oct. 12, 2012 for U.S. Appl. No. 12/645,870, filed Dec. 23, 2009.
Intellectual Property Office of Singapore, Search and Examination Report, dated Aug. 30, 2013 for Singapore Application No. 201107539-7.
Canadian Intellectual Property Office, "Office Action" mailed May 17, 2013 for Canadian Patent Application No. 2,758,791.
Intellectual Property Office of Singapore, "Search Report and Written Opinion," mailed May 30, 2013 for Singapore Patent Application No. 201204603-3.
Intellectual Property Office, "Office Action" mailed Apr. 26, 2013 for Taiwan Patent Application No. 099111307.
Canadian Intellectual Property Office, Official Action, mailed Jan. 23, 2014 for Canadian Patent Application No. 2,803,796.
Japan Patent Office, Notice of Rejection Grounds mailed Jan. 21, 2014 for Japanese Patent Application No. 2013-516600.
Hungarian Intellectual Property Office As Examiner According to the Memorandum of Understanding Between Intellectual Property Office of Singapore and the Hungarian Intellectual Property Office, Examination Report mailed Jan. 16, 2014 for Singapore Patent Application No. 201204603-3.
USPTO, Final Office Action mailed Aug. 1, 2013 for U.S. Appl. No. 12/645,870.
USPTO, Office Action mailed Oct. 17, 2013 for U.S. Appl. No. 12/648,024.
Canadian Intellectual Property Office, Notice of Allowance, dated Jun. 30, 2014 for Canadian Patent Application No. 2,758,791.
Australian Government, Notice of Acceptance, dated Jul. 16, 2014 for Australian Patent Application No. 2010236888.
U.S. Patent and Trademark Office, Final Office Action, mailed Aug. 14, 2014 for U.S. Appl. No. 12/648,024.
Japan Patent Office, "Decision of Rejection" mailed Jun. 3, 2014 for Japanese Patent Application No. 2012-506055.
Japan Patent Office, "Decision of Dismissal of Amendment" mailed Jun. 3, 2014 for Japanese Patent Application No. 2012-506055.
Korean Intellectual Property Office, "Notice of Allowance" mailed Jun. 9, 2014 for Korean Patent Application No. 10-2013-7001665.
China State Intellectual Property Office, Office Action, dated Aug. 27, 2014 for China Patent Application No. 201080016835.6.
U.S. Patent and Trademark Office, Notice of Allowance, dated Dec. 5, 2014 for U.S. Appl. No. 12/619,192.
U.S. Patent and Trademark Office, Final Office Action, dated Dec. 17, 2014 for U.S. Appl. No. 12/645,870.
Japan Patent Office, Decision of Grant, dated Nov. 25, 2014 for Japanese Patent Application No. 2013-516600.
State Intellectual Property Office of the People's Republic of China, Office Action for Chinese Patent Application No. 201180030790.2, mailed Feb. 27, 2015.
Office Action issued in Taiwan Patent Application No. 100122066 dated Apr. 29, 2015.
USPTO, Office Action for U.S. Appl. No. 12/648,024, mailed Mar. 12, 2015
USPTO, Office Action for U.S. Appl. No. 14/486,908, mailed Mar. 27, 2015.

* cited by examiner

SYSTEMS AND METHODS FOR AUTHORIZING ACCESS TO NETWORK SERVICES USING INFORMATION OBTAINED FROM SUBSCRIBER EQUIPMENT

TECHNICAL FIELD

The following discussion generally relates to authentication systems and methods, and more particularly to authentication systems and methods that authorize network services based upon information obtained from a set top box, television receiver or other subscriber device.

BACKGROUND

Most television viewers now receive television programming through a content aggregator such as a cable or satellite television provider. In the typical instance, encoded television signals are sent via a cable, direct broadcast satellite (DBS) or other data link to the viewer's home, where the signals are ultimately decoded in a set-top box, receiver or similar subscriber device. The decoded signals can then be viewed on a television or other appropriate display as desired by the viewer.

More recently, viewers have shown an interest in receiving television programming, as well as other media programming, in a streaming format via the Internet or similar networks. Streaming media typically provides the viewer with immediate access to a wide range of programming. In practice, however, many television networks, distributors and other sources of television content have been reluctant to provide their best content in a streaming format due to concerns of copying or other unauthorized use. Many other network services such as online gaming and/or the like have experienced similar challenges in preventing unauthorized access.

Although various parties have attempted to provide secure user authentication and secure authorization to media streams and other network services, most previous techniques have exhibited one or more disadvantages. It is therefore desirable to create systems and methods that are able to provide flexible yet secure access to media streams or other network services in a manner that is relatively easy to implement. These and other desirable features and characteristics will become apparent from the subsequent detailed description and the appended claims, taken in conjunction with the accompanying drawings and this background section.

BRIEF SUMMARY

According to various embodiments, systems and methods are described for authorizing access to a streaming video or other network service based upon information obtained from a set-top box (STB) or other subscriber equipment associated with the user requesting access. When a user requests access, the network service suitably contacts the subscriber device associated with the user via the network to obtain additional information, such as account verification and/or a listing of subscribed services. Information obtained from the subscriber device is processed by the network service to thereby determine if the user is authorized to use the service. If the user is authorized, then the service is provided via the network. Access to an online video stream, for example, can be conditioned upon the requesting user having an account with a DBS, cable or other content aggregator that includes a subscription to the content contained in the requested stream. This information may be queried from a set top box or other subscriber device associated with the requesting user for enhanced security and for flexibility across multiple content aggregators.

In various embodiments, a method to authenticate a user of a service on a network is provided. The method may be executed by a web server or other service that is available on the network. A request for access to the service is received via the network. In response to the request, a subscriber device associated with the user is contacted via the network. Authorization information associated with the user is obtained from the subscriber device over the network, and the obtained information is processed to thereby determine if the user is authorized to use the service. The service is then provided to the user via the network if the user is authorized to use the service.

Other embodiments provide a system to provide television programming to a viewer on a display in accordance with a subscription-based service with a television content provider. The system suitably comprises a program interface configured to receive the television programming and an authorization credential associated with the subscription-based service from the television content provider via a television distribution channel, a display interface configured to provide signals representing the television programming to the display, a network interface to a network that is separate from the television distribution channel, and a controller. The controller is configured to receive, via the network interface, a request from a server operating on the network and, in response to the request, to provide at least a portion of the authorization credential associated with the subscription-based service to the server operating on the network.

Still other exemplary embodiments provide a method executable by a set top box, television receiver or other subscriber device. The method suitably comprises receiving, via a television distribution channel, subscription information associated with the subscriber device, subsequently receiving an authorization request from a network server via a network other than the television distribution channel, and, in response to the authorization request, providing at least a portion of the subscription information to the server via the network.

These and other examples, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, access to a network service is granted or denied based upon information that is received from a set top box (STB), television receiver and/or other subscriber device that is associated with the user requesting access to the network service. A streaming video service, for example, could obtain information from the requesting user's cable or DBS receiver to ensure that the user is authorized to receive requested video streams from the network service. The information obtained from the subscriber device can be used to confirm that the user is authorized to use the service and/or to receive the particular video stream that has been requested. If the user requests a stream of content from a premium channel, for example, the information from the subscriber device may confirm that the user has purchased a subscription to that premium channel so that the streaming can be approved. Other embodiments may apply equivalent concepts to other types of network services, features and/or subscriber equipment as desired.

The exemplary systems and processes described herein may exhibit any number of advantages. By authenticating to the subscriber device itself rather than to a particular DBS provider, cable multiple system operator (MSO) or the like, for example, the network service can be made more universal and flexible in supporting multiple operators. By allowing the subscriber equipment to manage the connection to the MSO, DBS provider or other service provider, the network service may be made more readily compatible with multiple service providers. Similarly, a user may be able to maintain an account and/or otherwise continue to access the network service even if he or she switches to a different MSO, DBS provider or other service provider. Even further, the level of security can be greatly enhanced through direct authentication to the subscriber device. Other embodiments may provide additional or alternate advantages, as desired.

Figure 1:
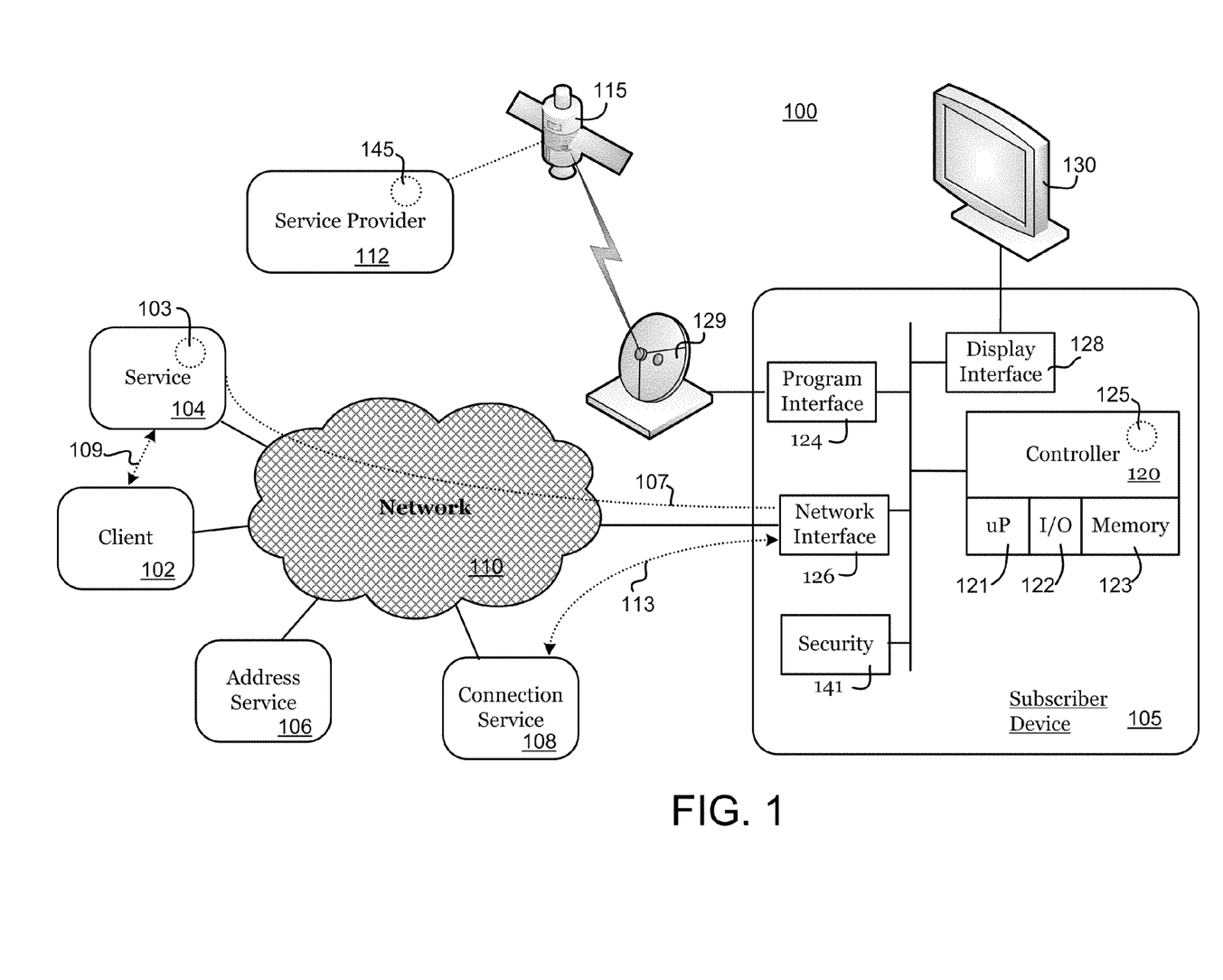
FIG. 1 is a block diagram of an exemplary system that authenticates access to a network service using information obtained from subscriber equipment associated with the user.

Turning now to the drawing figures and with initial reference to FIG. 1, an exemplary system 100 for authorizing a media stream or other service 109 provided from network service 104 to client 102 using a network 110 is shown. In the exemplary embodiment shown in the figure, a user of client 102 attempts to obtain service 109 from server 104. Network server 104 establishes a connection 107 with a set top box, television receiver or other subscriber device 105 using network 110 to obtain information that can be used to authorize the user's access to service 109. Service 104 identifies and/or locates subscriber device 105 on network 110 using any sort of address service 106, connection service 108 and/or the like, as described more fully below.

Network 110 is any digital or other communications network capable of transmitting messages between senders (e.g., client 102) and receivers (e.g., server 104). In various embodiments, network 110 includes any number of public or private data connections, links or networks supporting any number of communications protocols. Network 110 may include the Internet, for example, or any other network based upon TCP/IP or other conventional protocols. In various embodiments, network 110 could alternately or additionally incorporate a wireless and/or wired telephone network, such as a cellular communications network for communicating with mobile phones, personal digital assistants, and/or the like. Various embodiments may provide different features that make use of different types of networks 110, as appropriate.

Client 102 is any device, component or system capable of communicating with server 104 using network 110 in response to inputs from a user to request a service 109 from server 104. In various embodiments, client 102 is a conventional computer system that includes a conventional web browser program, media player program, and/or the like. Client 102 may be implemented using any sort of desktop or portable personal computer, for example, or using any sort of mobile phone, personal digital assistant, video game player, navigation device, or any other node communicating on network 110 as desired.

Network server 104 similarly represents any type of server, computing system or the like that provides any appropriate service 109 to one or more clients 102 via network 110. In various embodiments, network service 104 is implemented using conventional Internet server software (e.g., APACHE, MICROSOFT INTERNET INFORMATION SERVICES (IIS), GOOGLE WEB SERVER (GWS) and/or any other server applications) in conjunction with a content database, backend programming, scripting and/or the like that accompanies a conventional web server operating on the Internet or a similar network 110. Network service 104 may be implemented using any number of actual or virtual servers, including any of the "cloud computing" services provided by Amazon, Hewlett Packard, IBM, VMware, Google, Microsoft and/or any number of others.

Network service 109 is often described herein as a streaming media service that provides audio/video content via network 110 in response to user requests. In this example, the user typically navigates to server 104 by providing appropriate inputs to a web browser (e.g., any version of the various INTERNET EXPLORER, FIREFOX, SAFARI, OPERA, CHROME, MOZILLA and/or other browsers that are widely available on any number of different computing platforms) or the like. Typically, server 104 will provide a user interface that is viewable within the user's browser application and that allows the user to search for or otherwise locate particular media streams to be viewed. If the user is authorized to view the stream, server 104 typically provides the stream as service 109 via network 110. Client 102 suitably receives the stream and renders it to the user in a web browser, media player, or other application as appropriate. Equivalent network services 109 may provide video game content, executable programs, media content, and/or any other type of digital data in any sort of streaming or file based format as service 109.

In many cases, server 104 verifies that the user requesting a media stream or other service 109 is authorized to access the requested service. This authorization may be based upon subscription information or other information about the user that is obtained from the user's subscriber device 105, as described more fully below. In the example shown in FIG. 1, network server 104 executes an authorization routine 103 that verifies that a user of client 102 is authorized to access requested services 109. Authorization routine 103 may be written in any programming or scripting language and may be executed by server 104 in any manner.

As described herein, the authorization routine 103 suitably considers information obtained from subscriber device 105 via network 110. In the example shown in FIG. 1, server 104 and subscriber device 105 establish a virtual connection 107 through network 110 that allows for subscriber information or other data to be provided as appropriate. Virtual connection 107 may be, for example, a conventional TCP, UDP or similar session over network 110 that allows for exchange of communications and transfer of data. Note that connection 107 may not be persistent (e.g., a TCP type connection), but may simply represent an exchange of query/response messages between server 104 and device 105. To establish connection 107, server 104 locates subscriber device 105 on network 110 in any manner. FIG. 1, for example, shows an address server 106 and a connection server 108 that may be useful for establishing connection 107 in some embodiments. Subscriber device 105 may be identified on network 110 by an internet protocol (IP) address, uniform resource locator (URL) or the like.

Address server 106 is any server, computer system or other service available on network 110 that provides information to server 104 to allow server 104 to locate subscriber device 105 on network 110. In various embodiments, address server 106 suitably maintains a database of address, URL or other network location information about any number of subscriber devices 105. Typically, each subscriber device 105 registers with address server 106 on a periodic or other basis so that address server 106 is able to maintain current address information that can be relayed to service 104 as requested, thereby allowing service 104 to directly establish connection 107 with the subscriber device 105 at its current address. Address server 106 may be provided on network 110 by a television service provider such as a cable provider, DBS provider, or the like. To that end, address server 106 may able to identify a particular subscriber device 105 that is associated with a user from a username, account number, subscriber identification code, serial number or other identifier, as appropriate.

In some instances, a firewall or other security mechanism may prevent direct connections to subscriber device 105 from network 110. A connection server 108 or other mechanism may nevertheless be used to prompt subscriber device 105 to initiate a connection back to server 104, as desired. In various embodiments, subscriber device 105 is programmed (via firmware or the like) to establish and maintain a persistent connection 113 (e.g., a TCP connection or the like) with a known service 108 on network 110. Rather than contacting subscriber device 105 directly, then, server 104 may instead contact connection server 108, which then relays the request for connection 107 to subscriber device 105 via persistent connection 113. Subscriber device 105 suitably receives the request for connection and then initiates a new outgoing connection 107 to service 104, as desired. One example of a connection server 108 that could be used in some implementations is described in U.S. patent application Ser. No. 12/619, 192 filed on Nov. 16, 2009, which is entitled "SYSTEMS AND METHODS FOR DELIVERING MESSAGES ACROSS A NETWORK", although other types of connection services 108 may be used in other embodiments. In still other embodiments, connection services 108 may not be needed or provided.

Subscriber device 105 is any component, system or other equipment capable of receiving and processing subscriber-based programming and of communicating on network 110. FIG. 1 shows an exemplary embodiment in which subscriber device 105 is a conventional set-top box (STB) or other receiver capable of receiving television programming from a DBS provider, cable operator or MSO, terrestrial broadcast and/or other service provider 112. In this example, subscriber device 105 includes a controller 120 that interacts with a programming interface 124, a network interface 126, a display interface 128 and/or the like to present received television imagery to the viewer on display 130. The exemplary subscriber device 105 shown in FIG. 1 also includes a point-of-deployment (POD) security module 141 that is used to prevent unauthorized use of subscriber device 105. Other embodiments are not limited to STBs or other television receivers, however, and various equivalent embodiments may be implemented with any other components or products, including any sort of audio/video components, media control devices, home control systems and/or any other devices capable of performing the various functions described herein. Other embodiments may therefore have different components that may differ from those shown in FIG. 1.

Many different types of subscriber devices 102 may perform operations under the control of any sort of controller 120. In the example shown in FIG. 1, controller 120 is provided by any sort of microprocessor, microcontroller, digital signal processor or other programmable hardware capable of directing the actions and processes of subscriber device 105. In various embodiments, subscriber device 105 is based upon a "system on chip" (SoC) implementation that incorporates a microcontroller 121 with memory 123, input/output 122 and other features to perform the various signal processing and other actions of subscriber device 105. Various SoC and other integrated hardware implementations are available from Texas Instruments, Conexant Systems, Broadcom Inc., and many other suppliers as appropriate. Other embodiments may implement controller 120 and/or the other features of subscriber device 105 with any number of discrete and/or integrated processing components (e.g., any sort of microprocessor or microcontroller), memories 123, input/output features 122 and/or other features as desired.

In the STB implementation of FIG. 1, programming interface 124 is any receiver, demodulator or other interface capable of receiving television or other media programming as desired. In various embodiments, programming interface 124 is a satellite, cable or broadcast television receiver that receives programming from a cable, DBS or other source 112, although other embodiments may alternately or additionally provide interfaces to any other media source. In the example illustrated in FIG. 1, programming interface 124 is an interface to a DBS antenna 129 that receives programming signals that originate with an uplink center affiliated with a DBS source 112 and that are distributed by satellite 115. Equivalent embodiments, however, may receive programming from any sort of cable, terrestrial broadcast, wireless broadcast, network, and/or other source 112. Programming interface 124 typically tunes a receiver or similar circuit to receive programming modulated on a carrier wave that is distributed through any cable or wireless medium. Programming interface 124 may also provide demodulation and/or any appropriate decrypting and decompression of received programming, as appropriate. Programming interface 124 may be logically and/or physically combined with controller 120 in various embodiments.

Subscriber device 105 also includes an appropriate network interface 126. Network interface 126 may be implemented with any sort of physical, logical and/or other interface to network 110. In various embodiments, network interface 126 includes a conventional wired and/or wireless telephone or network adapter (e.g., a conventional network interface card (NIC) or the like). Interface 126 allows subscriber device 105 to communicate with servers 104, 106, 108 and/or the like across network 110. In various embodiments, the network interface 126 may be combined with the programming interface 109 to receive media programming over network 110, as desired.

Display interface 128 is any physical and/or logical interface to a television or other display 130. Typically, display interface 128 provides video output signals 127 to an external display 130 in any compatible format. In embodiments wherein display 130 is a conventional television, for example, display interface 128 may provide video and audio output signals in any conventional format, such as component video, S-video, High-Definition Multimedia Interface (HDMI), Digital Visual Interface (DVI), IEEE 1394, and/or any other formats as desired.

In various embodiments, subscriber device 105 executes a security application program interface (API) or another application 125 that receives and processes authorization queries from network server 104. This application 125 may reside within firmware or other software that is downloaded to device 105 as needed. Application 125 may be stored in memory 123 or elsewhere on subscriber device 105 for execution by processor 121 and/or other data processing features of controller 120.

Various embodiments of subscriber device 105 may additionally or alternately include a point-of-deployment (POD) security module 141 that interacts with a membership system 145 operated by a cable MSO or other service provider 112 to authenticate and/or authorize certain functions and features of subscriber device 105. In various embodiments, security module 141 obtains security information that is used to enable reception and/or decoding of certain programming channels received on program interface 124. This information may also be used, in some embodiments, to authorize and/or authenticate the user's actions on server 104, as appropriate. Several different types of security modules 141 may be defined by various standards, such as SCTE 28, SCTE 41, CEA-679and/or any number of others. Any of the Cable-CARD POD products, for example, could be used in some embodiments. Security module 141 may be implemented on a conventional PCMCIA card, or on any other suitable hardware and/or software that is compatible with subscriber device 105. Typically, security module 141 interacts with the membership system 145 of service provider 112 via program interface 124, although other embodiments may communicate with membership system 145 via network interface 126 and/or any other "back channel" available to subscriber device 105 as desired.

In operation, then, a user typically maintains a subscription with a cable, DBS or other content service provider 112 that distributes television programming to subscriber device 105. This subscription may include premium channels, specialized networks and/or other features that are not available to all subscribers of the service (e.g., HBO, Showtime, pay-per-view, etc.). Subscriber device 105 typically receives information about the user's subscription via program interface 124 that can be processed by controller 120 and/or security module 141 and stored in memory 123 or elsewhere within subscriber device 105. This information allows the subscriber device 105 to enforce any licensing or contractual requirements by preventing access to content for which the user has not paid a subscription fee. This same (or similar) information may be provided, via application 125 and network 110, to network server 104 so that content restrictions may be similarly enforced on service 109.

Figure 2:
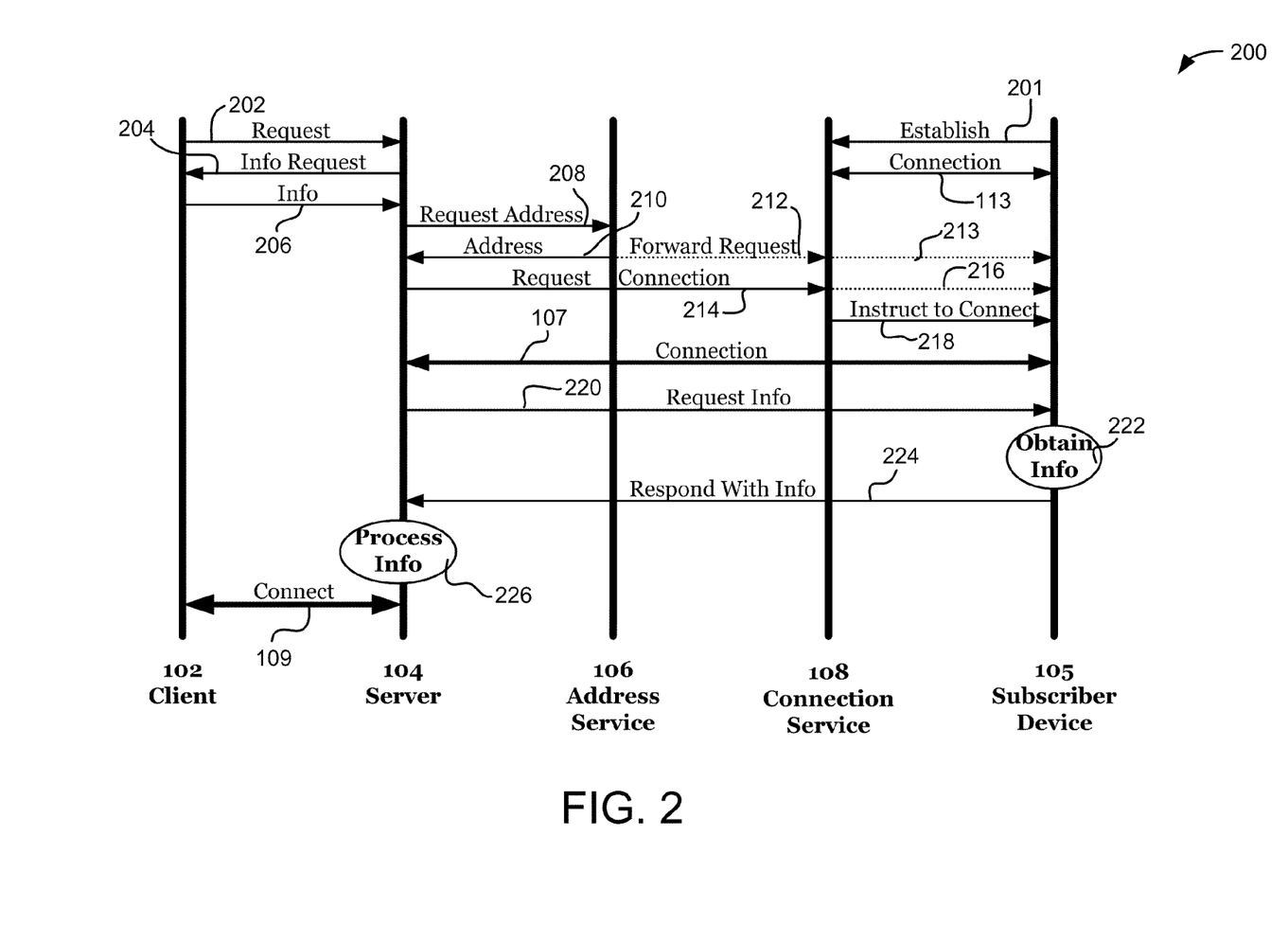
FIG. 2 is a diagram showing an exemplary process for authenticating a user's access to a network service using information obtained from subscriber equipment associated with the user.

FIG. 2 shows an exemplary process 200 to authorize access to a network service 109. As shown in FIG. 2, a user operates client 102 to request access to the service 109 from server 104 (function 202). The server locates the subscriber device 105 associated with the user in any manner (functions 208-218), and establishes a virtual connection 107 that can be used to request and receive information about the user (functions 220-224). This information from the subscriber device 105 may be processed (function 226) to authenticate the user and/or to authorize the requested service 109. Other embodiments may provide alternate or additional functions, as appropriate.

As noted above, a user requests access to a service 109 provided by a network server 104 using any sort of client device 102 (function 202). In various embodiments, the user simply operates a conventional web browser to a web page or the like that is hosted by server 104. The user selects the desired service 109 using conventional interface features.

Before providing service 109, server 104 may request additional information to identify the user and/or a subscriber device 105 that is associated with the user (function 204). This information may include conventional user ID/password information, personal information about the user (e.g., address, phone number, email address, etc.), information about the user's subscriber device 105 (e.g., a serial number or subscriber identifier), and/or any other information that allows the server 104 to obtain authorization data from the user's subscriber device 105. In some implementations, the user may be able to directly obtain a code or other identifier from a settings menu or other feature on subscriber device 105 that may be entered provided to server 104. The user provides the appropriate information from client 102 to server 104 (function 206) using the web browser interface, or in any other manner. In various embodiments, user information provided in function 206 may be stored at server 104 so that it need not be re-entered during future transactions with server 104.

The user's subscriber device 105 makes itself available on network 110 in any manner. In various embodiments, subscriber device 105 registers with connection service 108 (function 201) to establish the persistent connection 113, as appropriate. Registration with connection service 108 201 may take place when during startup of subscriber device 105, or at another appropriate time as desired.

As noted above, subscriber device 105 receives program content and additional information (function 205) via its program interface 124. In various embodiments, the received information 205 includes subscription information that describes the particular channels, packages, subscriptions or other features that are available (or unavailable) to the user. This information 205 may be updated as often as desired.

Server 104 authorizes the user's request for service 109 by contacting subscriber device 105 for additional information. Typically, server 104 will need to obtain an address, URL or other identifier associated with the user's particular subscriber device 105. In some cases, this information may be obtained directly from the user/client 102. In other cases, the subscriber device 105 is identified and located on network 110 by contacting an address server 106 and providing information about the user, such as the information provided in function 206 above. Address server 106 may be able to return an address, URL or the like (function 210) that allows server 104 to directly contact subscriber device 105 and/or connection server 108 to establish the connection 107. In such cases, server 104 suitably sends a connection request to connection service 108 (function 214) or subscriber device 105 (function 216) as appropriate. Alternately, the address server 106 may automatically contact connection server 108 (function 212) and/or subscriber device 105 (function 213) without further action by the server 104.

Subscriber device 105 may, in some cases, be unable to accept direct connection requests from network 110 due to a firewall or other security mechanism. In such cases, subscriber device 105 may nevertheless be contacted via the pre-established persistent connection 113 with connection server 108. As connection server 108 receives messages 212 or 214, for example, the server is able to send an instruction 218 via pre-established connection 113 that instructs subscriber device 105 to initiate a connection 107 with server 104. To that end, instruction 218 may include an address associated with server 104. Alternately, if the address of server 104 is already known to subscriber device 105, instruction 218 may simply instruct the device 105 to contact server 104 at the known address.

As noted above, connection 107 is any conventional TCP, UDP or other virtual connection across network 110. The particular information that is provided may be processed on device 105 in any manner (function 222). In various embodiments, application 125 (FIG. 1) handles incoming requests 220 for authentication information, gathers the requested information 222, and provides responses 224 as appropriate.

The information provided to server 104 confirms the user's subscription to a service and/or describes the particular services that are subscribed, including any premium content or the like. Such information may be formatted in an appropriate data structure (e.g., an XML format or the like) and transported to server 104 for further processing. Some implementations may also provide encryption or other security to obscure the information passed across network 110.

After receiving the subscription information or other information about the user, server 104 suitably processes the received information to verify that the user is authorized to receive the particular service 109. If the user is authorized, access is granted and service 109 is provided to the user. If the user is not authorized, access is denied and the user is prevented from further access to that service 109.

The various concepts described above may be enhanced or modified in any number of ways. In some particularly secure implementations, for example, the server 104 may provide a signal or message to an uplink or service center associated with service provider 112 when the user requests access to a service 109. Service provider 112 may then broadcast (or otherwise transmit) a digital credential or other secret over the satellite, cable or other media to be received by program interface 124. This digital credential may be provided during subsequent communications with the server 104 to provide a very high level of confidence that the user is truly associated with the particular subscriber device 105. This level of confidence may not be needed in all implementations, however, and direct messaging from content source 112 to subscriber device 105 in response to user requests for services 109 may not be practical in all settings or embodiments.

Figure 3:
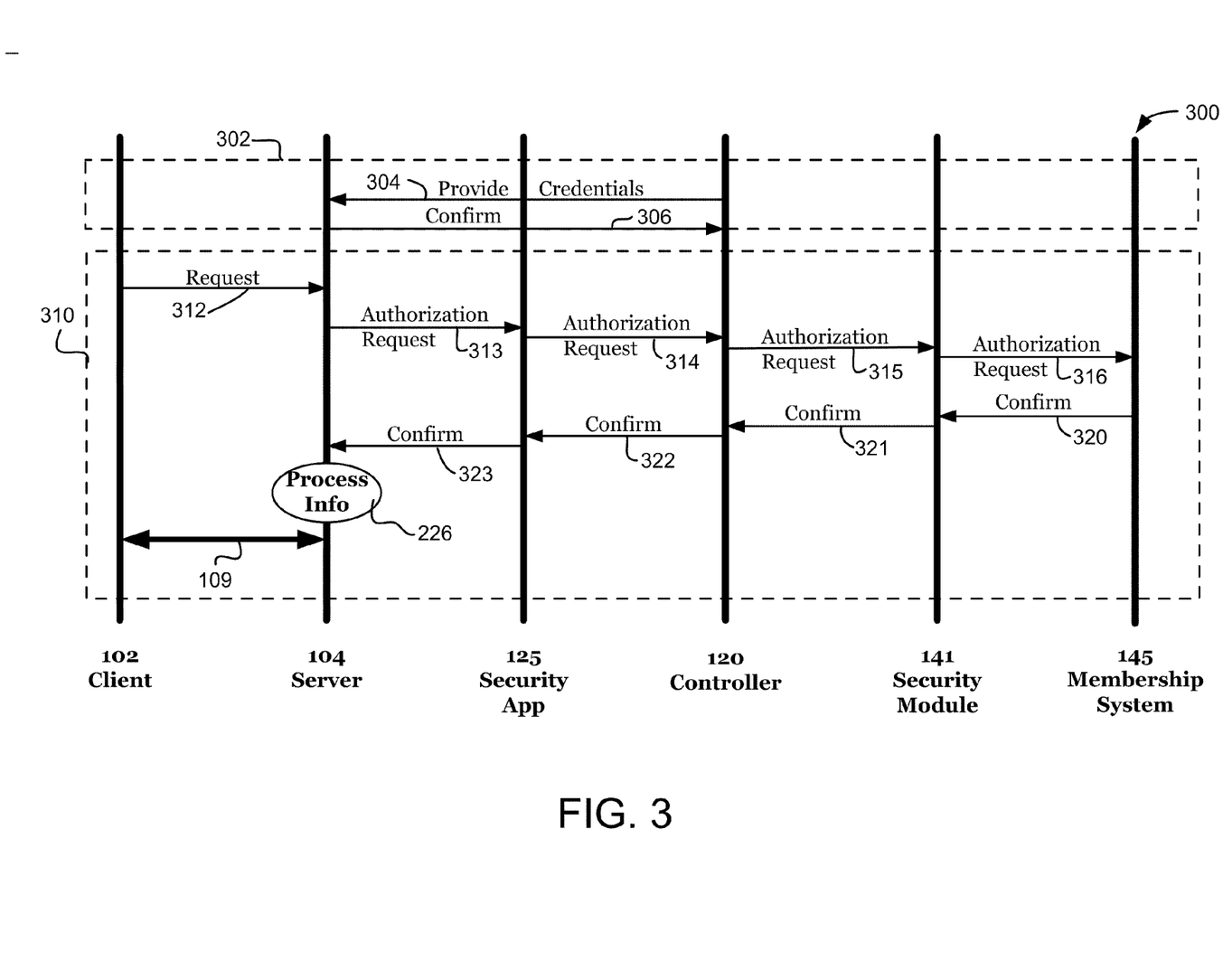
FIG. 3 is a diagram showing additional exemplary processes for authorizing and/or authenticating a user's access to a network service using information obtained from subscriber equipment associated with the user.

FIG. 3 shows alternate or additional functions 300 that allow interactions between the network server 104 and the subscriber device 105 to be used for authorization (process 302) and/or authentication (process 310). FIG. 3 shows, for example, an exemplary authorization process 310 that is processed by security application 125, security module 141 and membership system 145. The functions 300 shown in FIG. 3 may occur in some implementations without an intervening address service 106, thereby further streamlining communications between server 104 and subscriber device 105. Other embodiments, however, may implement some or all of functions 300 using intervening address and/or connection services 106, 108 as described above.

In the exemplary embodiment shown in FIG. 3, the user's STB or other subscriber equipment 105 initially provides authorization and/or authentication credentials (function 304) to server 104. Function 304 may be initiated by the user (e.g., using a menu or other interface feature of subscriber device 105), or in any other manner. In various embodiments, subscriber device 105 automatically contacts server 104 on network 110 at startup, at any regular or other time interval, and/or as requested by the user or server 104 to provide authentication, authorization and/or any other information as desired. As noted above, authentication information provided to server 104 may include credentials or other information that originated with service provider 112, as desired. Other information that may be provided could include location information about the subscriber device 105 (e.g., to allow server 104 to provide a proper program guide or the like), user demographics information, information about the user's subscription with service provider 112, and/or any other information as desired. Server 104 may confirm receipt of the received information, as desired (function 304).

Various embodiments may provide one or more requested services 109 based upon local authentication (e.g., as part of function 226) performed at server 104 using the information received in process 302. Other embodiments, however, may perform authorization 310 of particular services 109 by processing a query from server 104 to a membership system 145 affiliated with service provider 112. In the embodiment shown in FIG. 3, for example, server 104 provides an authorization request 313 across network 110 to subscriber device 105 in response to a user's request for service 109 being received at server 104 (function 312).

Request 313 is typically received on a logical port or other feature associated with customer device 105. In various embodiments, security application 125 is designed (e.g., using conventional socket structures or the like) to await messages on the logical port associated with the authentication service. Upon receipt of authentication request message 313, security application 125 appropriately transmits an authorization request message to security module 141. In the embodiment shown in FIG. 4, security application 125 formulates a query or other request 314 that is relayed to security module 141 via controller 120 (function 315). This request is then relayed, via security module 141, to a membership system 145 associated with the MSO, DBS operator or other service provider 112 (function 316). As noted above, communications between security module 141 and membership system 145 may be relayed via a cable or other program interface 124, via network interface 126, or in any other manner.

The authentication request 316 is processed at the membership system 145, and a confirmation response 320 is provided back to the security module 141. This response 320 may be provided, in turn, to controller 120 (function 321) and security application 125 (function 322). Security application 125 then transmits an appropriate response 323 via network interface 126 and network 110 to server 104. Server 104 is then able to process the receive information (function 226) and, if appropriate, to provide service 109 to the user. The basic functions described in FIG. 3 may be supplemented and/or modified as desired.

Various embodiments of function 300 therefore allow a service 104 on a network 110 to posit a real-time (or near real-time) query to a membership system 145 associated with a service provider 112 for authenticating and/or authorizing access to a service 109. This process 300 allows server 104 to authenticate and/or authorize subscribers to any number of service providers 112 using a common API or other interface to security application 125. To that end, security applications 125 could be formulated for any number of different types or models of subscriber devices 105 to support a common API or other protocol for servicing authorization/authentication queries received over network 110. Each application 125 would take advantage of the particular controller 120, security module 141, communications and/or any other resources available on that particular type and model of subscriber device 105, thereby allowing server 104 to support users from multiple service providers 112 without necessarily creating custom authorization/authentication mechanisms for each provider. Other embodiments may implement different features to achieve other advantages, as desired.

The various systems and methods described above therefore provide a flexible yet effective authorization for network services based upon information obtained from a STB or similar subscriber device. Various embodiments may supplement or modify the various concepts, structures and techniques described herein in any manner. To that end, the term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method to authenticate a user of a client device for a service on a network, the method comprising:
   receiving, by a server on the network, a request for access to the service from the client device via the network;
   in response to the request, the server contacting a subscriber device associated with the user via the network, the subscriber device comprising a set-top box or a television receiver, the subscriber device receiving content from a content provider via a communications channel other than the network in accordance with a subscription-based service with the content provider;
   obtaining, by the server via the network, authorization information associated with the subscription-based service from the subscriber device, the authorization information being obtained from the content provider by a security module of the subscriber device;
   processing, by the server, the authorization information obtained from the subscriber device to thereby determine if the user is authorized to use the service; and
   providing, by the server, the service to the client device via the network if the user is authorized to use the service.

2. The method of claim 1 further comprising obtaining an address associated with the subscriber device from an address server on the network, and wherein the obtaining comprises contacting the subscriber device via the network using the associated address.

3. The method of claim 1 further comprising requesting additional data from the user in response to the request for access to the service, receiving the additional data from the user, and identifying the subscriber device from the additional data.

4. The method of claim 1 wherein the service is a streaming video service and wherein the providing comprises providing streaming video content via the network.

5. The method of claim 4, wherein the subscriber device is a set top box that receives television content from a paid television service via the communications channel other than the network.

6. The method of claim 5 wherein the authorization information verifies that the user is a subscriber to the paid television service.

7. The method of claim 6 wherein the authorization information verifies that the user is authorized to view a particular media stream requested from the service by the user.

8. The method of claim 7 wherein the particular media stream corresponds to content available via a premium television channel, and wherein the authorization information verifies that the user has a subscription to the premium television channel.

9. The method of claim 6 further comprising transmitting a message a service center associated with the paid television service in response to receiving the request for access to the service, and wherein the authorization information obtained from the subscriber device comprises a digital credential transmitted to the subscriber device by the service center in response to the message transmitted to the service center.

10. The method of claim 1 wherein the service is a streaming video service that provides any of a plurality of program streams to users via the network, wherein the method further comprises receiving a user selection of a particular one of the program streams to be provided to the user, wherein the authorization information obtained from the subscriber device comprises an indication that the user is authorized to receive the particular program stream, and wherein the providing comprises providing the particular program stream to the user via the network if the user is authorized.

11. A subscriber device comprising:
   a security module of the subscriber device to interact with a television content provider to obtain authorization information associated with a subscription-based service from the television content provider;
   a program interface configured to receive, via a television distribution channel, television programming in accordance with the subscription-based service with a television content provider and the authorization information associated with the subscription-based service from the television content provider;
   a display interface configured to provide signals representing the television programming to a display;
   a network interface to a network that is separate from the television distribution channel; and
   a controller configured to receive, via the network interface, an authorization request from a server operating on the network and, in response to the authorization request, to provide at least a portion of the authorization information associated with the subscription-based service to the server operating on the network, wherein the server processes the portion of the authorization information to determine if a user of a client device is authorized to use the subscription-based service before providing the subscription-based service to the client device via the network if the user is authorized to use the subscription-based service.

12. The subscriber device of claim 11, wherein the portion of the authorization information confirms that a user associated with the subscriber device is a subscriber to the subscription-based service.

13. The subscriber device of claim 11, wherein the portion of the authorization information credential confirms describes content that the user is permitted to receive and display using the subscriber device.

14. The subscriber device of claim 11, wherein:
   the security module is configured to receive the authorization information via the program interface in response to the authorization request; and
   the controller is configured to relay the portion of the authorization information from the security module to the server operating on the network.

15. The subscriber device of claim 11, wherein the subscriber device comprises a set-top box or a television receiver.

16. A method comprising:
receiving, by a subscriber device via a television distribution channel, subscription information associated with a subscription-based service with a content provider, the subscriber device comprising a set-top box or a television receiver, wherein the subscription information is obtained from the content provider by a security module of the subscriber device that prevents unauthorized use of the subscriber device and the subscription information describes programming receivable by the subscriber device from the content provider via the television distribution channel that is authorized for viewing;
subsequently receiving, by the subscriber device, an authorization request from a network server via a network other than the television distribution channel; and
in response to the authorization request, providing, by the subscriber device, at least a portion of the subscription information to the network server via the network, wherein the network server processes the subscription information obtained from the subscriber device to thereby determine if a user of a client device is authorized to use the subscription-based service before providing the subscription-based service to the client device via the network if the user is authorized to use the subscription-based service.

17. The method of claim 1 further comprising establishing a persistent connection with a connection service on the network, receiving a request to establish a connection to the network server via the persistent connection and contacting the network server to establish the connection over the network, wherein the providing comprises providing at least the portion of the subscriber information to the network server via the connection.

18. The method of claim 1 wherein the network server is a streaming video service that provides streams of content corresponding to the television programming receivable by the subscriber device, and wherein the subscriber device is associated with the user of the network server, and wherein the at least the portion of the subscriber information is provided to the network server to allow the network server to determine whether the user of the network server has subscribed to a particular stream of content that is available from the network server.

* * * * *